July 8, 1952

E. E. GESNER 2,602,710

TOOL SUPPORTING CARRIAGE

Filed March 31, 1949

INVENTOR
*Edwin E. Gesner.*
BY
*Walter S. Edwards.*
ATTORNEY

Patented July 8, 1952

2,602,710

UNITED STATES PATENT OFFICE 2,602,710

TOOL SUPPORTING CARRIAGE

Edwin E. Gesner, Branford, Conn.

Application March 31, 1949, Serial No. 84,569

8 Claims. (Cl. 308—6)

This invention relates to tool carriages and more particularly to a tool carriage adapted to reciprocate in a supporting structure to carry a supported tool transversely across work to be acted upon by the tool. The tool carriage of this invention is particularly adapted to support a circular saw of a wood working machine of the type generally known as radial saws.

This application is a continuation in part of my application Serial No. 706,856 filed October 31, 1946.

The features and principles of this invention are herein illustrated embodied in a carriage adapted to support a motor driven circular saw and to be reciprocated in an arm which overhangs the work to be cut by the saw. It is particularly desired in structures of this nature that the travel of the saw, or tool, across the work, be in a straight line, parallel with the surface of the work supporting table upon which the work is supported, and that all subsequent cuts be parallel with each other. It is also desirable that the carriage be freely movable along the supporting arm, that it be accurately guided in the arm without appreciable lateral or vertical play, and that the effects of wear may be quickly and readily compensated for by the provision of easily operated and accessible means.

One object of this invention is to provide an improved tool supporting carriage.

Another object is to provide in a tool carriage of the above nature, improved means to guide it in its reciprocatory movements in its supporting member.

Still another object is to provide improved means, in the structure of a tool carriage, to compensate for wear of the movable and cooperating parts thereof.

A further object is to provide in a radial saw an improved circular saw supporting and guiding mechanism whereby the travel of the saw across, or along, the work to be acted upon thereby, will be in a straight line without appreciable variation and be parallel to the surface of the work supporting table.

A still further object is to provide an improved tool supporting carriage which will be relatively inexpensive to manufacture, simple in construction, of a minimum number of parts, compact, pleasing in appearance, and very efficient and durable in use.

With the above and other objects in view, which will appear as the description proceeds, there has been illustrated in the accompanying drawings, one form of reciprocatory carriage in which the features and principles of this invention may be conveniently and practically embodied.

Figure 1:
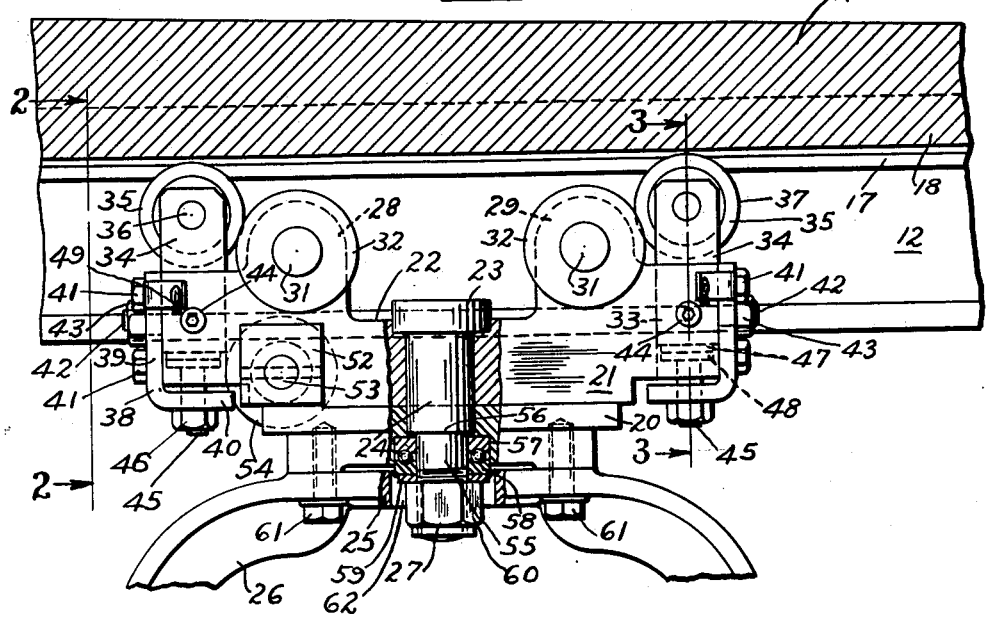
Figure 1 is a broken cross-sectional view of the tool supporting carriage of this invention shown mounted in operative position in a supporting arm.
Figure 2:
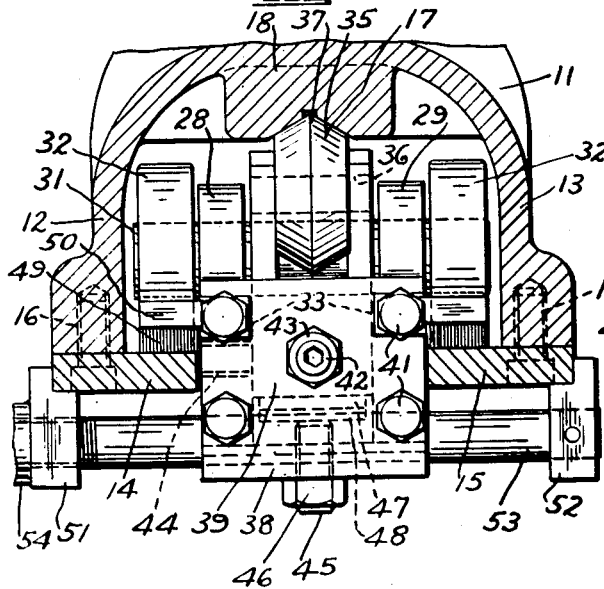
Figure 2 is a broken and enlarged cross-sectional view taken on the line 2—2 of Figure 1.
Figure 3:
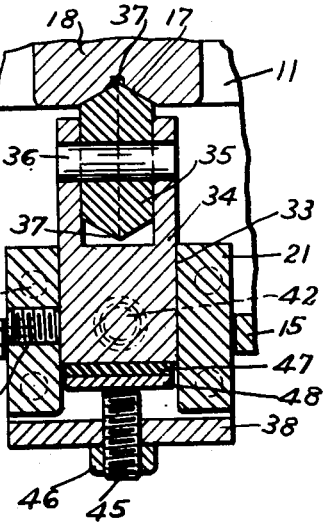
Figure 3 is a broken and enlarged cross-sectional view taken on the line 3—3 of Figure 1.

Referring now to the drawings wherein like reference numerals designate like parts throughout the several views, the reference numeral 11 denotes an arm of a radial saw, or like machine, and which generally extends horizontally over a work supporting table (not shown). The arm 11 is generally of inverted U-shape in cross-section with depending legs 12 and 13. Flat and substantially horizontal carriage supporting bars, or tracks, 14 and 15 are secured, as by screws 16, to and extend along the lower edge surface of the legs 12 and 13 respectively. The tracks 14 and 15 extend inwardly toward each other, and substantially the entire length of the arm 11 to provide the maximum of reciprocatory movement for the tool supported on the carriage of this invention. An inverted shallow V-shaped groove, or track 17, is formed in the upper wall 18 of the arm 11. This track 17 extends from the front end of the arm 11 rearwardly the greater part of the length of the arm.

The tool supporting carriage of this invention comprises an elongated rectangular base block 21 which is cut away at 22 in its upper surface and intermediate its ends to receive the head 23 of a journal bolt 24. The bolt 24 extends downwardly through the block 21 and into a collar 20. The bolt 24 has a lower portion 55 which is smaller in diameter than the upper portion whereby a downwardly directed shoulder 56 is formed between the portions. An upwardly directed counterbore 57 is formed in the collar 20, the bottom of which is slightly spaced downwardly from the shoulder 56 of the bolt 24. A ball thrust bearing 58 is seated in the counterbore 57 through which the lower portion 55 of the bolt extends. A washer 59 is disposed on the lower bolt portion 55 and a nut 60 is screwed onto the lower end of the bolt to snugly hold the ball bearing 58 in place. A tool supporting frame 26 is secured to the collar 20 by screws 61 and the washer 59 and nut 60 extend downwardly through a control opening 62 provided in the base portion 25 of the frame 26 and are free from contact therewith. Due to the above structure, free rotative movement of the frame 26 with the collar 20 on the carriage base block 21 is obtained without any possibility of the nut 60 becoming loosened.

Longitudinally spaced pairs of bearing lugs 28 and 29 extend upwardly from the block 21, one pair being disposed at each end of the cutaway portion 22 of the block 21. A transverse shaft 31 extends through the lugs of each pair, and rollers 32 are mounted on the ends of each shaft 31 and ride upon the upper surfaces of the respective tracks 14 and 15, and support the base block thereon within the arm 11, and between the opposing edges of the tracks 14 and 15, the greater part of the base block 21 depending below the tracks 14 and 15.

A vertically directed slot 33 is formed in each end of the base block 21 to slidingly receive a bracket 34. The bracket 34 is bifurcated at its upper end to receive a roller 35 which is mounted upon a shaft 36 extending across the bifurcated end of the bracket 34. The periphery of the roller 35 is of shallow inverted U-shape in cross-section forming an annular rib 37 to fit the groove 17, or upper track, in the upper wall of the arm 11. The bracket 34 is retained in the slot 33 by an L-shaped plate 38, one leg 39 of which fits over and covers the open side of the slot 33 at the end of the base block 21 and the other leg 40 fits over and under the block 21 to cover the lower open end of the slot 33. The plate 38 is secured to the end of the base block 21 by screws 41. A set screw 42, having a lock nut 43, passes through the plate leg 39 to engage the bracket 34 and clamp it against the rear wall of slot 33 in any vertically adjusted position, and a set screw 44 passes through a side wall of the slot 33 to clamp the bracket 34 against the opposite side wall.

The bracket 34 may be vertically adjusted in the slot 33 to cause the V-shaped peripheral edge of the roller 35, or annular rib 37, to engage within the groove, or upper track 17, by means of a set screw 45. The set screw 45 has a lock nut 46 and passes through the plate leg 40 into engagement with the lower end of the bracket 34. It has been found that, due partly to slight irregularities in machining the groove, or track, 17, and partly to possible warping of the arm 11 during the assembly of the tracks 14 and 15 thereto, it is particularly difficult to so delicately adjust the roller 35 vertically into engagement with the track 17 that no binding will occur to interfere with the free and easy movement of the carriage along the arm 11. To overcome such a disadvantage a pad 47 of rubber, or like resilient material is disposed between the upper end of the set screw 45 and the undersurface of the bracket 34. A metal plate 48 is preferably disposed between the pad 47 and the end of the screw 45 to prevent the pad 47 from being distorted, or damaged, by the screw 45, and to evenly spread the pressure of the screw 45 over the lower end surface of the bracket 34 and thus insure substantially perfect vertical movement of the bracket 34 in the slot 33. The cooperating action between the roller 35 and the track 17 insures substantially true line guiding of the carriage along the arm 11. Preferably the included angle between the sides of the V-shape of both the track 17 and the roller 35 is substantially 120 degrees.

When the tool, supported on the frame 26, is one whereby dust, such as saw-dust, or chips, is formed while operating on work, the upper surface of the tracks 14 and 15 are soon covered with dust, or chips, and this effects the smooth movement of the tool carriage along the arm, interfering with the roller action. To substantially maintain the tracks 14 and 15 clean of dust brushes 49 are provided one in front of each of the rollers 32. The brushes 49 are held in strips 50 which are secured to the carriage by the upper screws 41. Upon reciprocatory movement of the carriage along the arm 11, the brushes 49 wipe dust, or the like, from the tracks 14 and 15.

Carriage locking means is provided whereby the carriage may be firmly secured in any position along the arm 11. This means includes a pair of clamp lugs 51 and 52, one at each side of the arm 11 and arranged to have their upper edges engage the outer edge surface of the tracks 14 and 15 respectively. A rod 53 having an end secured to one of these lugs, in this instance lug 52, passes through the base block 21 and through the other lug 51. A hand wheel 54 is threaded on the other end of the rod 53 which when rotated in one direction causes the lugs 51 and 52 to be drawn toward each other to clamp the tracks 14 and 15 between them and thus secure the carriage in the desired position along the arm 11.

The carriage of this invention rides particularly smoothly upon the arm 11 and without chatter, or binding even when especially heavy cuts are being made in work by the tool carried thereby. This is partly due to the balanced arrangement in the structure of the carriage whereby the greater weight is below the tracks 14 and 15, and partly due to the positioning of the axes of the supporting rollers 32 particularly close, vertically, to the axes of the rollers 35. It will be noted that the axis of the rollers 32 and the axis of the roller 35, of each set, are spaced apart vertically less than the radius of the roller 35. In effect this positions the opposite rollers 32 of one set from the roller 35 of the same set so that their centers are on a line from the center of roller 35 at an angle of substantially 60 degrees from the vertical, which is substantially the same as the angle of one face of the V groove and of the annular rib 37 on the roller 35. By such an arrangement a very compact and efficient carriage supporting and guiding mechanism is provided for such machines as radial saws and the like.

While there has been shown and described herein a mechanism in which the features and principles of this invention may be embodied in practice, it will be understood that the same may be embodied in other specific forms without departing from the spirit and essential attributes thereof, and it is therefore desired that the present embodiment be considered in all respects as illustrative, and not restrictive, reference being had to the claims rather than to the foregoing description to indicate the scope of the invention.

Having thus fully disclosed the invention, what is claimed as new and for which it is desired to secure Letters Patent, is:

1. In combination, an arm of generally inverted U-shape in cross-section and having depending laterally spaced apart legs, a longitudinally disposed track secured to the lower edge surface of each leg, said tracks extending inwardly toward each other, a tool supporting carriage comprising a base block disposed between the opposing inner edges of said tracks and depending below said tracks, a pair of laterally spaced apart rollers journaled to said block adjacent each end thereof, one roller of each pair riding on an adjacent track to support the block thereon, an inverted V-shaped track on the upper wall of the U-shaped arm transversely midway between the legs thereof, a bracket slidably mounted for vertical movement at each end of said base block, and a guide roller journaled in each bracket, said guide roller having an annular rib, V-shaped in cross-section, on its periphery to cooperate with the inverted V-shaped track on said arm to guide the carriage in its reciprocating movements in said arm.

2. In combination, an arm of generally inverted U-shape in cross-section and having laterally spaced apart leg portions, a longitudinally disposed track secured to the lower edge surface of each leg, said tracks extending laterally toward each other, a tool supporting carriage comprising a base block disposed in the arm between the legs thereof, depending below said tracks, and substantially filling the space between the opposing edges of said tracks, a pair of laterally spaced apart rollers journaled to said block adjacent each end thereof, one roller of each pair riding on an adjacent track to support the block thereon, an inverted V-shaped track on the upper wall of, and within, the U-shaped arm laterally midway between the legs thereof, said base block having a vertically directed slot in each end thereof, a bracket mounted in each slot for vertical sliding movement therein, an L-shaped plate secured to each end of the block having a first leg covering the slot opening at the block end and a second leg covering the slot opening at the underside of the block, and a guide roller journaled in each bracket, said guide roller having an annular rib on its periphery, said rib being V-shaped in cross-section to cooperate with the inverted V-shaped track on said arm to guide the carriage in its repicrocating movements along and within said arm.

3. In combination, an arm of generally inverted U-shape in cross-section and having laterally spaced apart leg portions, a longitudinally disposed track secured to the lower edge surface of each leg, said tracks extending laterally toward each other, a tool supporting carriage comprising a base block disposed in the arm between the legs thereof, depending below said tracks, and substantially filling the space between the opposing edges of said tracks, a pair of laterally spaced apart rollers journaled to said block adjacent each end thereof, one roller of each pair riding on an adjacent track to support the block thereon, an inverted V-shaped track on the upper wall of, and within, the U-shaped arm laterally midway between the legs thereof, said base block having a vertically directed slot in each end thereof, a bracket mounted in each slot for vertical sliding movement therein, an L-shaped plate secured to each end of the block having a first leg covering the slot opening at the block end and a second leg covering the slot opening at the underside of the block, an adjusting screw threaded through the second leg of said plate to raise said bracket in said slot, a clamp screw threaded through the first leg of said plate to clamp the bracket against the end wall of said slot, and a guide roller journaled in each bracket, said guide roller having an annular rib on its periphery, said rib being V-shaped in cross-section to cooperate with the inverted V-shaped track on said arm to guide the carriage in its reciprocating movements along and within said arm.

4. In combination, an arm of generally inverted U-shape in cross-section and having laterally spaced apart leg portions, a longitudinally disposed track secured to the lower edge surface of each leg, said tracks extending laterally toward each other, a tool supporting carriage comprising a base block disposed in the arm between the legs thereof, depending below said tracks, and substantially filling the space between the opposing edges of said tracks, a pair of laterally spaced apart rollers journaled to said block adjacent each end thereof, one roller of each pair riding on an adjacent track to support the block thereon, an inverted V-shaped track on the upper wall of, and within, the U-shaped arm laterally midway between the legs thereof, said base block having a vertically directed slot in each end thereof, a bracket mounted in each slot for vertical sliding movement therein, an L-shaped plate secured to each end of the block having a first leg covering the slot opening at the block end and a second leg covering the slot opening at the underside of the block, an adjusting screw threaded through the second leg of said plate, a flat plate in the slot below the lower end of said bracket to be engaged by said screw, a pad of resilient material between said flat plate and the lower end of said bracket, said screw acting through said flat plate and said pad to raise said bracket toward the V-shaped track in said arm, means to clamp said bracket in raised position, and a guide roller journaled in each bracket, said guide roller having an annular rib on its periphery, said rib being V-shaped in cross-section to cooperate with the inverted V-shaped track on said arm to guide the carriage in its reciprocating movements along and within said arm.

5. In combination, an arm of generally inverted U-shape in cross-section and having laterally spaced apart leg portions, a longitudinally disposed track secured to the lower edge surface of each leg, said tracks extending laterally toward each other, a tool supporting carriage comprising a base block disposed in the arm between the legs thereof, depending below said tracks, and substantially filling the space between the opposing edges of said tracks, a pair of laterally spaced apart rollers journaled to said block adjacent each end thereof, one roller of each pair riding on an adjacent track to support the block thereon, an inverted V-shaped track on the upper wall of, and within, the U-shaped arm laterally midway between the legs thereof, said base block having a vertically directed slot in each end thereof, a bracket mounted in each slot for vertical sliding movement therein, an L-shaped plate secured to each end of the block having a first leg covering the slot opening at the block end and a second leg covering the slot opening at the underside of the block, an adjusting screw threaded through the second leg of said plate, a flat plate in the slot below the lower end of said bracket to be engaged by said screw, a pad of resilient material between said flat plate and the lower end of said bracket, said screw acting through said flat plate and said pad to raise said bracket toward the V-shaped track in said arm, a clamp screw threaded through the first leg to engage said bracket and clamp it against said block, another clamp screw threaded through a side of said block to engage said bracket and clamp it against the opposing side of said block within the slot, and a guide roller journaled in each bracket, said guide roller having an annular rib on its periphery, said rib being V-shaped in cross-section to cooperate with the inverted V-shaped track on said arm to guide the carriage in its reciprocating movements along and within said arm.

6. In combination, an arm of generally inverted U-shape in cross-section and having depending laterally spaced apart legs, a longitudinally disposed track secured to the lower edge surface of each leg, said tracks extending inwardly toward each other, a tool supporting carriage comprising a base block disposed between the opposing inner edges of said tracks and depending below said tracks, a pair of laterally spaced apart rollers journaled to said block adjacent each end thereof, one roller of each pair riding on an adjacent track to support the block thereon, an inverted V-shaped track on the upper wall of the U-shaped arm transversely midway between the legs thereof, a bracket slidably mounted for vertical movement at each end of said base block, a guide roller journaled in each bracket, said guide roller having an annular rib, V-shaped in cross-section, on its periphery to cooperate with the inverted V-shaped track on said arm to guide the carriage in its reciprocating movements in said arm, a clamp lug at each side of said arm and adapted to engage the outer edge of the adjacent track, and means carried by said carriage to simultaneously draw said blocks together to secure the carriage to the arm.

7. In combination, an arm of generally inverted U-shape in cross-section and having depending laterally spaced apart legs, a longitudinally disposed track secured to the lower edge surface of each leg, said tracks extending inwardly toward each other, a tool supporting carriage comprising a base block disposed between the opposing inner edges of said tracks and depending below said tracks, a pair of laterally spaced apart rollers journaled to said block adjacent each end thereof, one roller of each pair riding on an adjacent track to support the block thereon, an inverted V-shaped track on the upper wall of the U-shaped arm transversely midway between the legs thereof, a bracket slidably mounted for vertical movement at each end of said base block, a guide roller journaled in each bracket, said guide roller having an annular rib, V-shaped in cross-section, on its periphery to cooperate with the inverted V-shaped track on said arm to guide the carriage in its reciprocating movements in said arm, a clamp lug at each side of said arm and adapted to engage the outer edge of the adjacent track, a rod secured to one lug and passing through said base block to and through the other of said lugs, and a hand wheel threaded onto the outer end of said rod to draw said lugs together into clamping engagement with said tracks to secure said base block to said tracks.

8. In combination, an arm of generally inverted U-shape in cross-section and having depending laterally spaced apart legs, a longitudinally disposed track secured to the lower edge surface of each leg, said tracks extending inwardly toward each other, a tool supporting carriage comprising a base block disposed between the opposing inner edges of said tracks and depending below said tracks, a pair of laterally spaced apart rollers journaled to said block adjacent each end thereof, one roller of each pair riding on an adjacent track to support the block thereon, an inverted V-shaped track on the upper wall of the U-shaped arm transversely midway between the legs thereof, a bracket slidably mounted for vertical movement at each end of said base block, a guide roller journaled in each bracket, said guide roller having an annular rib, V-shaped in cross-section, on its periphery to cooperate with the inverted V-shaped track on said arm to guide the carriage in its reciprocating movements in said arm, and a flat brush secured to each end of said block in lengthwise alignment with each roller and being in engagement with the upper surface of the track to clean said track surface in advance of the roller as the carriage reciprocates in said arm.

EDWIN E. GESNER.

REFERENCES CITED

The following references are of record in the file of this patent:

UNITED STATES PATENTS

| Number | Name | Date |
| --- | --- | --- |
| 1,794,836 | DeWalt | Mar. 3, 1931 |
| 2,022,289 | Knapp | Nov. 26, 1935 |
| 2,312,356 | Ocenasek | Mar. 2, 1943 |
| 2,353,088 | Schutz | July 4, 1944 |
| 2,383,195 | Horman | Aug. 21, 1945 |